(No Model.) 2 Sheets—Sheet 2.
J. F. WOOD.
SUGAR CANE SCRAPER AND PEA VINE HARVESTER.
No. 321,562. Patented July 7, 1885.
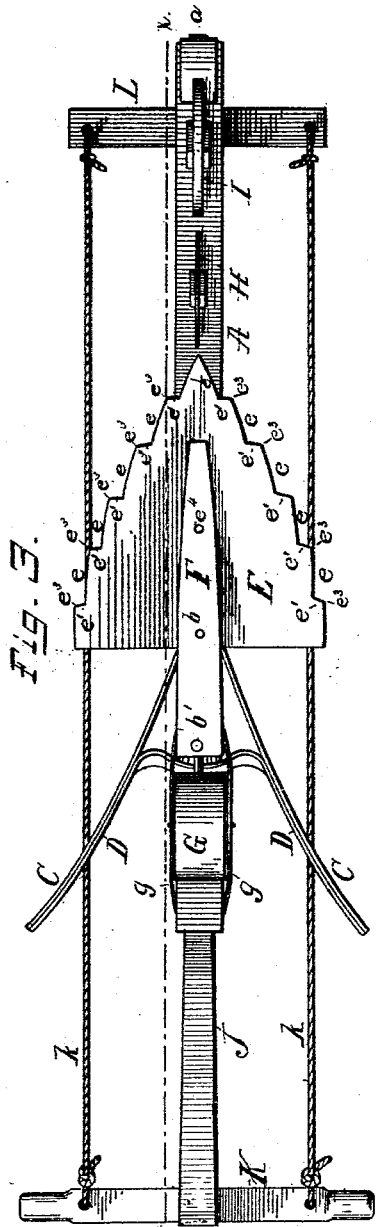
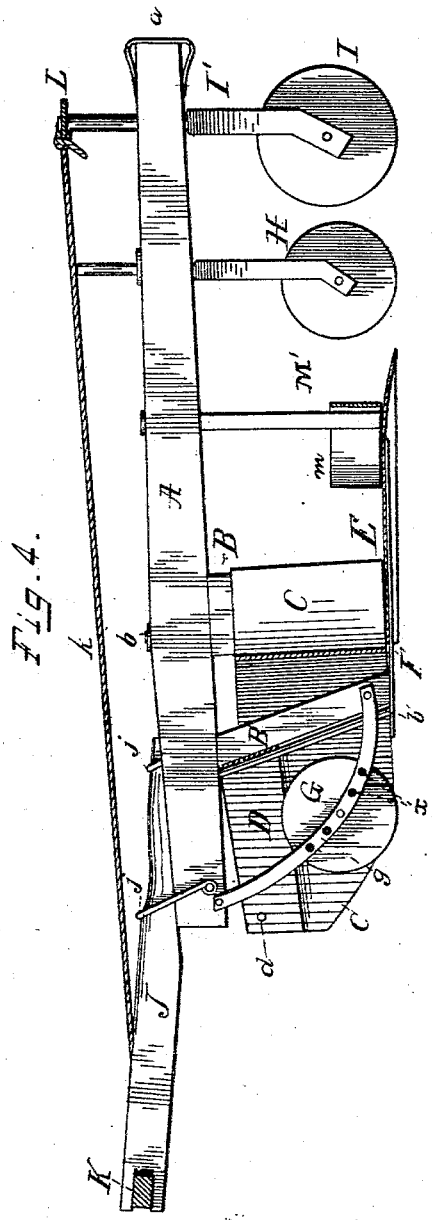
Witnesses. Inventor.

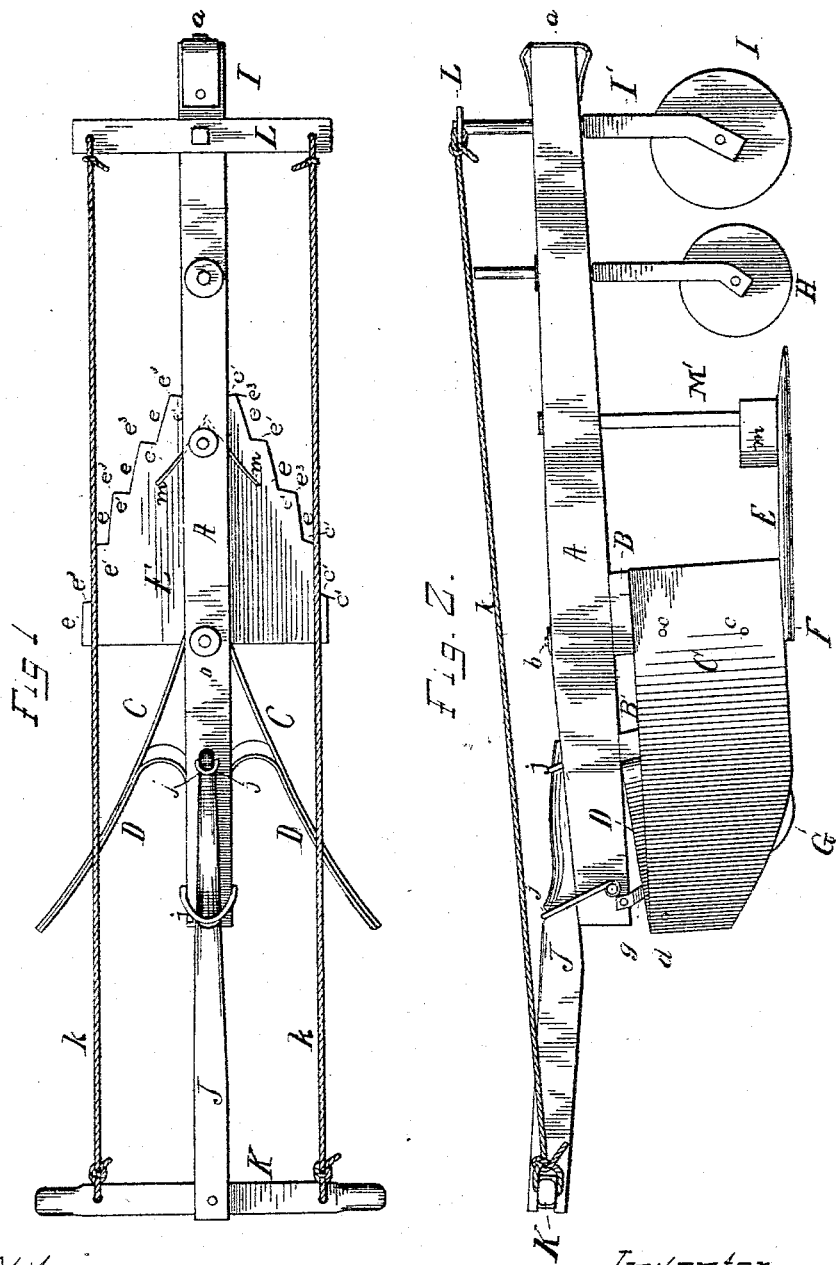

UNITED STATES PATENT OFFICE.

JOHN FULKERSON WOOD, OF HOUMA, LOUISIANA.

SUGAR-CANE SCRAPER AND PEA-VINE HARVESTER.

SPECIFICATION forming part of Letters Patent No. 321,562, dated July 7, 1885.

Application filed May 23, 1885. (No model.)

*To all whom it may concern:*

Be it known that I, JOHN FULKERSON WOOD, a citizen of the United States, residing at Houma, in the parish of Terre Bonne and State of Louisiana, have invented certain new and useful Improvements in Sugar-Cane Scrapers and Pea-Vine Harvesters; and I do declare the following to be a full, clear, and exact description of the invention, such as will enable others skilled in the art to which it appertains to make and use the same.

My invention relates to that class of agricultural implements intended mainly for use in the first cultivation of sugar-cane and harvesting of the pea-vine; and my said invention consists in an improved implement combining in one structure the several essential elements necessary, first, for light cultivation or "scraping," as it is called, along the top of the rows of sugar-cane previous to its upward growth, to destroy the weeds, and, second, to cut the pea-vines, as also corn-stalks, from the ridges where grown, and evenly arrange them between the said ridges, from whence they may be gathered for use as fodder or covered by a plow when intended to enrich the land.

For a better comprehension of the details comprising my invention reference must be had to the accompanying drawings, in which—

Figure 1 represents a plan view, Fig. 2 a side elevation, and Fig. 3 a bottom view of a combined cane-scraper and pea-vine harvester constructed according to my invention. Fig. 4 represents a sectional side elevation on the line $x\ x$, Fig. 3.

A represents an ordinary plow-beam, to which the several parts of the machine are secured, and to the forward end of which is secured a clevis, $a$, by which the team is attached to the implement.

B is a vertical, and B' an inclined standard or support, secured by through-bolts $b$ and $b'$, respectively, to the bottom of beam A, to form the means by which the mold-board, share, &c., are secured in position.

C C represent the mold-board, made preferably of a single piece of some flexible sheet metal folded together at its middle and secured upon each side of the vertical standard B by bolts $c$ and at the rear ends to a bent sheet-metal spring, D D, by the bolts $d\ d$. This spring D is secured to the rear of the inclined standard B', and extends around, conforming to the shape thereof, as shown in Fig. 3, to the rear end of the mold-board, where it is secured by the bolts $d\ d$. The object of this spring is to provide an elastic bearing or cushion for the mold-board, and permit it to move back and forth should it encounter an immovable obstruction. Thus the danger and annoyance of throwing the whole implement out of position is avoided.

E is the share or point, which is made triangular in shape and with its edges formed into a number of serrations or cutting-edges, $e$, for the purposes as will presently appear. The two front edges of this cutting-share are, as before stated, made sharp, and the serrations therein are formed by a series of long straight edges, $e$, having a general direction toward the front and rear of the cutter, and a series of short edges, $e'$, running at right angles to the direction of the ones $e$, whereby the edges of the said cutter or share have somewhat the appearance of saw-blades, the points $e^3$ representing the teeth thereof, so that when said cutter is drawn against the standing plants its edges will act with a shearing and sawing cut upon said plants, and thereby effect a complete severence thereof, and requiring less power than were the edges of the cutter simply straight from end to end.

The cutting-share, in addition to having its edges serrated, as described, is made convex in cross-section, and is secured by a bolt, $e^4$, to a shoe, F, which latter extends to near the point of the share and to slightly beyond the rear of the inclined standard B', and is secured in position by the through-bolts $b$, $b'$, and $e^4$. The object of this shoe is to strengthen the share and form a bearing and wearing surface for the machine.

G is a roller secured in position at the rear of the machine by curved braces $g\ g$, having holes $x$, by which said roller may be adjusted vertically, extending from the rear end of the beam A to the lower end of the inclined standard B'. The object and function of this roller is to gage the depth of cut of the machine, and also to form a means by which the same can be readily turned from one row into another, or conveyed to and from the field. At the front end of the beam, immediately in front of the point of the cutting-share, is arranged a revolving colter, H, vertically adjustable, to gage the depth of cut thereof, and immediately in front of this colter is arranged a caster-roller, I, also vertically adjustable, and for regulating the depth of cut of the machine.

As will be seen by reference to the drawings, this implement is not supplied with the usually formed and arranged handles; but instead thereof the following devices are employed—that is to say, at the rear of the beam A, and extending in a vertically-inclined position therefrom, is secured by straps or braces *j* a bar, J, to the outer end of which is pivoted a cross-bar, K. To this cross-bar K, at each end thereof, are attached wires or cords *k*, which extend forward and are attached to the outer ends of a similar cross-bar, L, secured to the top end of the standard I' of the roller I. By this construction and arrangement the proper means for holding the machine is secured, and, in addition thereto, the same may be readily guided into proper position without lifting or adjusting the whole implement, as is now customary.

To use the machine as a cultivator or "scraper" for sugar-cane, soon after the planting of said cane and before it has sprouted very much the machine is run directly upon the top of the ridges, so as to scrape or cut the grass, &c., from said ridges and remove it, together with a portion of the crust of the earth therefrom. This is accomplished by the cutting-share, which, being convex, conforms somewhat to the shape of the ridge and cuts the grass and crust of the earth as well from the top thereof, as also a portion of the sides, which grass and earth, after being cut, is removed by the mold-boards following behind said share, and deposited in the hollows between the ridges, where, in decaying, it will serve as a fertilizing material.

To guide the machine the cross-bar K is adjusted or turned upon its pivot by the hands of the operator, which movement of the bar K in a corresponding manner affects the relative position of the bar L on the standard I' of the guide-roller I, and thereby guides or directs the machine in its proper position without having to lift it in the least. The broad flat share enters just below the surface of the earth, being prevented from going too far by the rollers at the front and rear, and cuts off all weeds, &c., and by the assistance of the revolving colter, which divides the weeds, and the elastic mold-boards, the said weeds, &c., are removed from the ridges and deposited in the hollows beside the same. Should an immovable object be met with, the elasticity of the mold-boards will permit the machine to preserve its usual position and not be thrown out of line, as sometimes happens when the said mold-board is rigid, as is usual. When intended for use as a harvester for pea-vines as well as cornstalks, the machine, as in scraping, is run directly upon the top of the rows of peas or corn. The colter in this, as in the other case, divides the vines and stalks, so that an equal portion thereof is deposited upon each side of the ridges, and the saw-edges of the share or cutter-blade cut them down close to or beneath the surface of the ground. As the machine advances, the mold-boards impinge against the cut vines, &c., and press them from the crest of the rows into the hollows between them, forming continuous rows of the material, which may now be very easily gathered for use as fodder, or covered by a plow, "trenched," as it is called, when desired to enrich the soil by this means.

The object of forming the cutter convex is to adapt it to the curvature of the ridge, so that the weeds, &c., are not alone cut from the top of the said ridge, but from the sides as well. Thus the cane-shoots which are about to start from the earth are permitted to attain somewhat of a growth before the weeds again appear. The subsequent hand-hoeing is therefore greatly lessened.

The revolving colter divides the weeds, &c., at the point of the cutter into two equal halves, so that the said weeds, vines, &c., are equally distributed at each side of the ridges, and the clogging and clinging around the front edge of the mold-board and upon the share is prevented.

As a further means of preventing the clogging of the said share and front of the mold-board, it is proposed to apply at the front of said share, directly upon the top thereof, a fender, Fig. 4, which consists of two short blades or wings, *m*, secured at their front edges to a standard, M', which extends upward and is secured to the beam A. This fender is made removable, so that it may be disconnected from the machine, if desired; but its use will be found very serviceable to prevent the undue clogging of the share and mold-board.

Having thus fully described my invention, its operation, &c., what I claim as new therein, and desire to secure by Letters Patent of the United States, is—

1. The combination, with the beam A, having the standards B B' secured thereto, of the cutting point or share E, made triangular and convex in shape, and with the serrated edges *e e' e*$^3$, shoe F, elastic mold-board C C, and springs D D, all constructed and arranged substantially as described, for the purposes specified.

2. The combination, with the beam A, standards B B', elastic mold-board C C, springs D, triangular share E, having serrated edges, of the roller I, arranged at the front end of the beam, and roller G at the rear, substantially as described, for the purposes specified.

3. The combination, with the beam A, carrying the standards B B', mold-board C, springs D, and triangular serrated-edged cutter-share E, roller G, and roller I I', arranged at the front of the said beam A upon a standard, I', carrying a cross-bar, L, of the inclined bar J, secured to the rear end of the beam A, cross-bar K, pivoted to said bar, and ropes k, connecting the same with the one L, substantially as described, for the purposes specified.

4. The combination, with the beam A and standards B B', of the elastic mold-boards C C, springs D, share E, shoe F, rollers G and I, revolving colter H, bar J, cross-bars K and L, and connecting-ropes k, all substantially as described, for the purposes described and shown.

5. The combination, with the beam A, standards B B', elastic mold-boards C C, springs D, share E, revolving colter H, rollers G and I, of the removable fender M M' m, arranged at the top front portion of the said share E, for the purposes specified.

JOHN FULKERSON WOOD.

In presence of—
WM. A. SHAFFER,
J. B. CLABAUGH.